(12) United States Patent
Champion et al.

(10) Patent No.: US 10,478,994 B2
(45) Date of Patent: Nov. 19, 2019

(54) FABRICATING A THREE-DIMENSIONAL OBJECT

(71) Applicant: HEWLETT-PACKARD DEVELOPMENT COMPANY, L.P., Houston, TX (US)

(72) Inventors: David A. Champion, Lebanon, OR (US); James Elmer Abbott, Jr., Albany, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 212 days.

(21) Appl. No.: 15/512,422

(22) PCT Filed: Oct. 8, 2014

(86) PCT No.: PCT/US2014/059744
§ 371 (c)(1),
(2) Date: Mar. 17, 2017

(87) PCT Pub. No.: WO2016/057034
PCT Pub. Date: Apr. 14, 2016

(65) Prior Publication Data
US 2017/0246761 A1 Aug. 31, 2017

(51) Int. Cl.
*B28B 1/00* (2006.01)
*B28B 11/24* (2006.01)
(Continued)

(52) U.S. Cl.
CPC ............ *B28B 1/001* (2013.01); *B28B 11/241* (2013.01); *B28B 17/0081* (2013.01);
(Continued)

(58) Field of Classification Search
CPC ... B29C 64/141; B29C 64/194; B29C 64/165; B29C 64/209; B29C 64/291;
(Continued)

(56) References Cited

U.S. PATENT DOCUMENTS 5,340,656 A  8/1994 Sachs et al.
5,736,092 A  4/1998 Apte et al.
(Continued)

FOREIGN PATENT DOCUMENTS

DE  10356193   9/2004
EP  2001656    12/2008
(Continued)

OTHER PUBLICATIONS

Agrawal, D.K.; Microwave Processing of Ceramics; Aug. 8, 2008; http://is.muni.cz/el/1431/podzim2006/C7780/um/Read/2659278/mw_cera m_synth_Agraval.pdf.
(Continued)

*Primary Examiner* — Michael P Wieczorek
(74) *Attorney, Agent, or Firm* — HP Inc. Patent Department

(57) ABSTRACT

In one example, a method of fabricating a three-dimensional object includes depositing a layer of build material, depositing a coalescing agent onto the layer of build material according to a slice of three-dimensional model data, irradiating the coalescing agent with microwave radiation such that the coalescing agent converts the microwave radiation into heat to coalesce the build material in which the coalescing agent was deposited.

15 Claims, 5 Drawing Sheets

(51) Int. Cl.
*B29C 64/165* (2017.01)
*B33Y 70/00* (2015.01)
*B33Y 10/00* (2015.01)
*B33Y 30/00* (2015.01)
*B33Y 50/02* (2015.01)
*B28B 17/00* (2006.01)
*B29C 64/209* (2017.01)
*B29C 64/291* (2017.01)

(52) U.S. Cl.
CPC .......... *B29C 64/165* (2017.08); *B29C 64/209* (2017.08); *B29C 64/291* (2017.08); *B33Y 10/00* (2014.12); *B33Y 30/00* (2014.12); *B33Y 50/02* (2014.12); *B33Y 70/00* (2014.12)

(58) Field of Classification Search
CPC ... B28B 17/0081; B28B 11/241; B28B 1/001; B33Y 70/00; B33Y 30/00; B33Y 10/00
See application file for complete search history.

(56) References Cited

U.S. PATENT DOCUMENTS

| | | |
|---|---|---|
| 7,455,804 B2 | 11/2008 | Patel et al. |
| 7,708,929 B2* | 5/2010 | Monsheimer ....... B29C 67/0077 264/460 |
| 2002/0145213 A1 | 10/2002 | Liu et al. |
| 2007/0238056 A1 | 10/2007 | Baumann |
| 2007/0241482 A1* | 10/2007 | Giller ................ B29C 64/165 264/494 |
| 2008/0157436 A1 | 7/2008 | Patel |
| 2011/0304067 A1 | 12/2011 | Rossfeldt |
| 2013/0337277 A1 | 12/2013 | Dikovsky et al. |
| 2014/0079841 A1 | 3/2014 | Pridoehl |

FOREIGN PATENT DOCUMENTS

| | | |
|---|---|---|
| TW | 200510168 A | 3/2005 |
| TW | I244463 B | 12/2005 |
| WO | WO-2005105412 | 11/2005 |
| WO | WO-2013092997 | 6/2013 |

OTHER PUBLICATIONS

Ramesh; Use of Partially Oxidized SiC Particle Bed for Microwave Sintering of Low Loss Ceramics; Nov. 17, 1998; http://webee.technlon.ac.il/people/schachter/sintering/1.pdf.

* cited by examiner

FABRICATING A THREE-DIMENSIONAL OBJECT

BACKGROUND

Additive manufacturing devices allow for the fabrication of virtually any three-dimensional object by structuring material, layer by layer, so as to form the three-dimensional object desired. The properties of the three-dimensional object may vary depending on the materials used as well as the type of additive manufacturing technology implemented.

BRIEF DESCRIPTION OF THE DRAWINGS

The accompanying drawings illustrate various examples of the principles described herein and are a part of the specification. The illustrated examples are given merely for illustration, and do not limit the scope of the claims.

Throughout the drawings, identical reference numbers designate similar, but not necessarily identical, elements.

DETAILED DESCRIPTION

Figure 1:
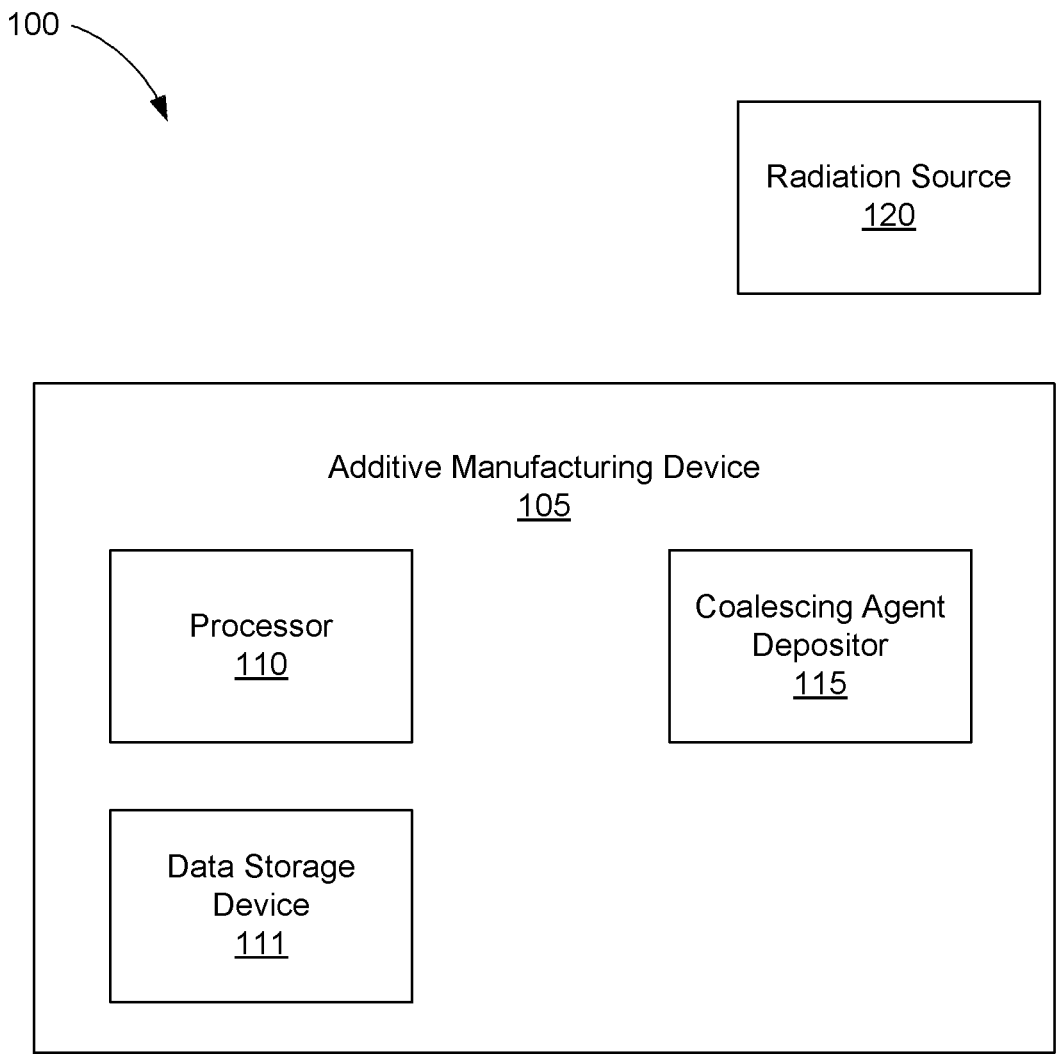
FIG. 1 is a block diagram of an additive manufacturing system according to one example of the principles described herein.

Additive manufacturing techniques may generate a three-dimensional object through the solidification of a loose or liquid build material. The properties of fabricated objects are dependent on the type of build material and the type of solidification mechanism used.

In some examples, the build material is powder-based. A chemical binder or radiation-responsive coalescing agent is deposited into a layer of powered build material to form one layer of the object. Another type of additive manufacturing uses laser sintering. In this process, a laser is applied to heat the build material. The laser used is precise, but may be costly to purchase and maintain. Another type of additive manufacturing involves extruding the build material onto a surface in the form of a layer of the object being fabricated. The deposited material is subsequently heated to sinter that build material. This process may be relatively cost effective, but poor resolution of the final product may render the product incompatible with some applications where a more precise product is needed.

The present specification describes a method of fabricating a three-dimensional object by depositing a layer of build material, depositing a coalescing agent onto the layer of build material according to a slice of three-dimensional model data, and irradiating the coalescing agent with microwave radiation such that the coalescing agent converts the microwave radiation into heat to coalesce the build material in which the coalescing agent was deposited. More specifically, a layer of build material, for example a powdered build material, is spread in a build area of the additive manufacturing system. The coalescing agent is then deposited in those portions of that layer of build material that should be solidified to form the portion of object being fabricated associated with that layer. This process repeats, layer-by-layer, until the object is complete.

The present specification further describes an additive manufacturing system that includes a processor, a coalescing agent depositor, and a microwave radiation source. The processor controls the coalescing agent depositor to deposit a coalescing agent onto a layer of build material according to three-dimensional model data. The processor further controls the microwave radiation source to irradiate the coalescing agent with microwave radiation such that the coalescing agent converts the microwave radiation into heat to coalesce the build material in which the coalescing agent was deposited.

The present specification also describes an apparatus to generate a three-dimensional object that includes a coalescing agent depositor, a microwave radiation source, a processor, and a data storage device communicatively coupled to the processor. The processor executes computer code to control the coalescing agent depositor to deposit an amount of coalescing agent onto a layer of build material according to three-dimensional model data stored in the memory. The build material is transparent to the microwave radiation source. The processor executes computer code to control the microwave radiation source to irradiate the coalescing agent such that the coalescing agent converts the microwave radiation into heat to coalesce build material in which the coalescing agent was deposited.

As used in the present specification and in the appended claims, the term "coalesce" means to solidify or fuse, for example by melting or sintering, into a solid or coherent mass a build material that was formerly loose or fluid. In one example described herein, a build material is coalesced such that portions of the formless build material are brought together to form a single mass or a number of masses. In one example, coalescing of a build material may include sintering of that build material.

Additionally, as used in the present specification and in the appended claims, the term "coalescing agent" means any substance that causes a build material to coalesce. In one example, the coalescing agent may be any substance that absorbs radiant energy, causing the coalescing agent to heat, which then heats a build material sufficiently so that the build material coalesces.

Further, as used in the present specification and in the appended claims, the term "build material" means a loose or fluid material, for example, a powder, from which a desired three-dimensional object is formed in additive manufacturing.

Still further, as used in the present specification and in the appended claims, the term "slice" means a set of model data for a planar cross-section of a three-dimensional object represented electronically by a three-dimensional model from which the "slice" is taken.

Even further, as used in the present specification and in the appended claims, the term "layer" means a planar cross-section of a physical, three-dimensional object. In additive manufacturing, a layer of the three-dimensional object corresponds to a slice of the three-dimensional model data.

Even still further, as used in the present specification and in the appended claims, the term "additive manufacturing device" means any device that fabricates a three-dimensional object from a build material using slices of model data to form corresponding layers of the object Even still further, as used in the present specification and in the appended claims, the term "a number of" means any positive number comprising 1 to infinity.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described in connection with that example is included as described, but may not be included in other examples.

Turning to FIG. 1, a block diagram of an additive manufacturing system (100) according to one example of the principles described herein is shown. The additive manufacturing device (105) of the additive manufacturing system (100) may be any type of additive manufacturing device capable of fabricating a three-dimensional object from the build material using slices of model data to form corresponding layers of the object.

In the illustrated example, the additive manufacturing system (100) includes an additive manufacturing device (105) and an electromagnetic radiation source (120). In this example, the radiation source (120) is a microwave source. The additive manufacturing device (105) includes a processor (110) and a coalescing agent depositor (115). As will be described in more detail below, the system (100) may, with the processor, control the coalescing agent depositor (115) to deposit a coalescing agent onto a layer of build material according to the three-dimensional model data of the object being fabricated. The processor (110) can then cause the radiation source (120) to irradiate the coalescing agent. The coalescing agent converts the energy received into heat and coalesces the build material in portions of the build material layer in which the coalescing agent was deposited.

The processor (110) may include the hardware architecture to retrieve executable code from the data storage device (111). The executable code may, when executed by the processor (110), cause the processor (110) to implement at least the functionality of depositing a layer of build material on a substrate and depositing a coalescing agent onto the layer of build material for a number of layers of a three-dimensional object. The executable code may also, when executed by the processor (110), cause the processor (110) to implement the functionality of irradiating the coalescing agent with the radiation source (120) such that the coalescing agent converts the radiation received into heat to coalesce the build material. The nascent object may be irradiated after all the layers of the object have been formed with coalescing agent in each, or layer-by-layer. In the course of executing code, the processor (110) may receive input from, and provide output to, a number of the remaining hardware units.

The coalescing agent depositor (115) may be any device capable of depositing the coalescing agent. In one example, the coalescing agent depositor (115) may be a piezoelectric fluid depositor or a thermal fluid depositor. In this example, a fluid carrier may be used to transport the coalescing agent. The fluid in this example may serve to consolidate a powdered build material and disperse the coalescing agent relatively evenly over the powder on which it is deposited. For example, the delivery of the coalescing agent onto the build material may cause the coalescing agent to penetrate into a layer of build material. The degree of penetration may depend, for example, on the quantity of agent delivered, on the nature of the build material, on the nature of the agent, the three-dimensional data defining the three-dimensional object, among other factors.

As noted above, in the illustrated example, the radiation source (120) may provide microwave radiation to the coalescing agent. The energy of the microwave radiation may be adjusted based on the type of materials used to generate the three-dimensional object and the process used to generate the three-dimensional object. The properties of the microwave energy may be selected based on the properties of the coalescing agent used.

The length of time that radiation is applied may be dependent, for example, on the characteristics of the radiation source; the characteristics of the build material; the characteristics of the coalescing agent, or combinations thereof. The type of radiation source used may depend on the characteristics of the build material and characteristics of the coalescing agent.

In the illustrated example, the build material is substantially transparent to microwave energy, meaning that microwave energy will not cause appreciable heating in the build material. Consequently, the temperature needed to coalesce the build material would be difficult or impossible to achieve through application of microwave or electromagnetic energy.

The build material may be powder-based material such as a dry or wet powder-based material comprising particulate or granulated materials. For example, the build material may be a ceramic or glass powder, such as aluminum oxide ($Al_2O_3$) or alumina. Alternatively, the build material may be a metal oxide, such as titanium oxide ($TiO_2$). The build material may also be a combination of one or more of the above examples. These examples are not intended to be limiting. The present specification contemplates the use of other build materials suitable for use in the system and with the methods described herein.

The coalescing agent may be, for example, carbon black, graphite, metallic nanoparticles, nanoglass, nano-oxides, filler agents, iron ferrite or combinations of these. Generally, the coalescing agent may be any substance capable of being heated by radiation so as to impart that heat to coalesce the build material in which it is deposited. Different coalescing agents may be mixed or added to modify the properties of the resulting coalescing agent. Other additives may be included so as to control the amount of radiation energy needed to activate the coalescing agent in the build material. Some components may be added to the coalescing agent in order to change the physical properties of the resulting three-dimensional object such as the color, texture, and weight, among others properties.

The coalescing agent depositor (115) may be scanned in an x-y grid to deposit coalescing agent as needed over a layer of build material in a build area. Alternatively, the coalescing agent depositor (115) may span a width of the build area in which a layer of build material is deposited and may only scan in one direction over the build area. This is analogous to a scanning print head and a page-wide array in traditional printing.

As explained, the build material is heated so as to coalesce by heat generated by the coalescing agent from radiation received from the radiation source (120). In this process, the coalescing agent may provide all the heat to coalesce the build material. Alternatively, the coalescing agent may be heated before it is deposited such that an initial amount of heat is received by the build material from the application of the coalescing agent. In this way, less heat may then need to be produced from the radiation provided to the coalescing agent to coalesce the build material.

The build material in a layer that is not coalesced may serve to provide heat insulation for other areas of unused build material. The unused build material may also provide mechanical support to the three-dimensional object being formed.

Although FIG. 1 shows the radiation source (120) as being separate from the additive manufacturing device (105), the radiation source (120) may be incorporated into the additive manufacturing device (105). Where the radiation source (120) is separate from the additive manufacturing device (105), the radiation source may be a microwave furnace. In such an example, each layer of build material and coalescing agent may be deposited onto a powder bed as defined by the three-dimensional model data. Once all of these layers have been deposited, the entire powder bed may be removed from the additive manufacturing device (105) and placed in the microwave furnace. The microwave furnace may subject all the layers of the nascent object to microwave energy at the same time, causing the coalescing agent to heat up and the build material to coalesce, where needed, into the desired object.

Where the radiation source (120) is incorporated into the additive manufacturing device (105), the radiation source (120) may comprise a microwave emitter. In this example, as each layer of build material is deposited on the powder bed, the coalescing agent deposited onto that layer build material, and the radiation source (120) irradiates that layer to coalesce the build material before a subsequent layer of the object is formed.

In one example, the radiation source (120) may comprise both a microwave furnace and a microwave emitter as described above. During operation, the build material may be deposited on the powder bed and a coalescing agent may be deposited onto the build material. In this example, the microwave emitter may initially fuse the build material for preparation to be placed in the microwave furnace. The microwave energy used to initially fuse the build material may be relatively lower energy than that used to fully coalesce the build material. Once each layer has been deposited and fused as above, the entire powder bed may be removed from the additive manufacturing device (105) and placed in the microwave furnace. The microwave furnace may then subject the entire nascent object to microwave energy causing the coalescing agent to heat up and the build material to fully coalesce into the desired object.

Figure 2:
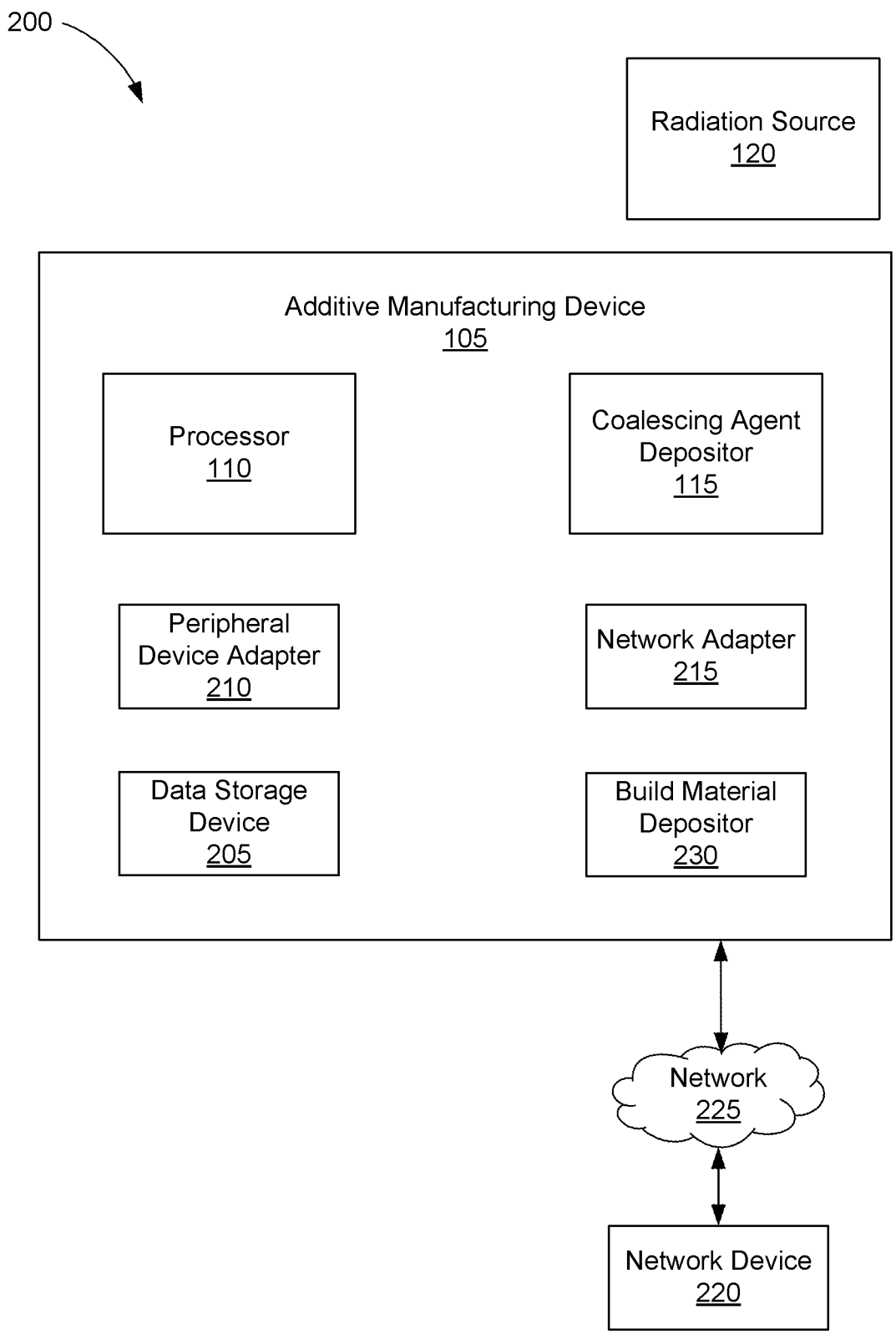
FIG. 2 is a block diagram of an additive manufacturing system according to another example of the principles described herein.

FIG. 2 is a block diagram of an additive manufacturing system (200) according to another example of the principles described herein. The system (200) may comprise a radiation source (120) and an additive manufacturing device (105) comprising a processor (110) and coalescing agent depositor (115) as described above in connection with FIG. 1. In FIG. 2, the additive manufacturing device (105) may further comprise a peripheral device adapter (210), a data storage device (205), a network adapter (215), a network device (220) connected to the additive manufacturing device (105) via a network (225), and a build material depositor (230).

The data storage device (205) may store data such as executable program code that is executed by the processor (110) or other processing device. As will be discussed, the data storage device (205) may specifically store computer code representing a number of applications that the processor (110) executes to implement at least the functionality described herein.

The hardware adapters (210, 215) in the additive manufacturing device (105) enable the processor (110) to interface with various other hardware elements, external and internal to the additive manufacturing device (105). For example, the peripheral device adapter (210) may provide an interface to input/output devices, such as, for example, a display device, a mouse, or a keyboard. The peripheral device adapters (210) may also provide access to other external devices such as an external storage device, a number of network devices such as, for example, servers, switches, and routers, client devices, other types of computing devices, and combinations thereof.

The network adapter (215) may provide an interface to other computing devices within, for example, the network (225). This may enable the transmission of data, particularly object model data, between the additive manufacturing device (105) and other devices located within the network. The network (225) may be any type of network sufficient to communicatively couple two devices such as the additive manufacturing device (105) and the network device (220) together. The network (225) may be an intranet, an internet, or an extranet, among others.

The build material depositor (230) may be any type of device capable of applying a layer of build material onto a powder bed. The thickness of a particular layer of build material can depend on the amount of coalescing agent and radiation energy to be applied in order to form the three-dimensional object. In one example, the thickness of the layer of build material may be 1 micron to 5 millimeters thick. In another example, the thickness of the layer of build material may be 1 to 200 microns thick. In still another example, the thickness of the layer of build material may be 50 to 150 microns thick. In yet another example, the thickness of the build material is about 100 microns thick.

Figure 3:
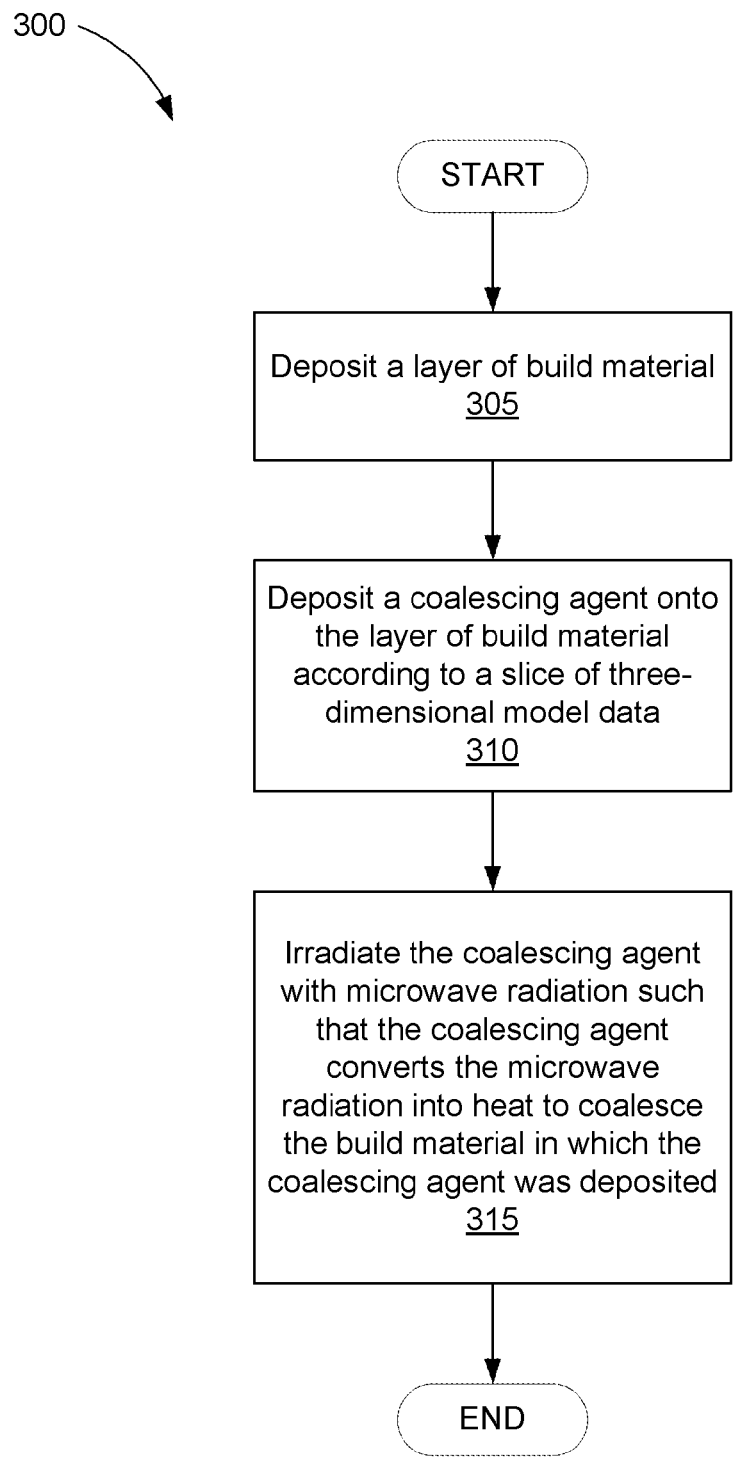
FIG. 3 is a flowchart showing a method of fabricating a three-dimensional object according to one example of the principles described herein.

FIG. 3 is a flowchart showing method of fabricating a three-dimensional object according to one example of the principles described herein. The method (300) may begin with depositing (305) a layer of build material. The build material may be deposited (305) onto a substrate such as powder bed associated with the additive manufacturing device (FIG. 1, 105; FIG. 2, 105). In one example, the powder bed may be moved in an x-direction, y-direction, and z-direction in order to facilitate with the deposition of the coalescing agent according to the three-dimensional model data. In another example, the table may remain stationary while the coalescing agent depositor (FIG. 1, 115; FIG. 2, 115) moves relative to the powder bed. In yet another example, the powder bed and coalescing agent depositor (FIG. 1, 115; FIG. 2, 115) may each move relative to each other in an x-direction, y-direction, a z-direction, or combinations thereof. As will be discussed below, the entire table may be removed from the additive manufacturing device (FIG. 1, 105; FIG. 2, 105) and inserted into a microwave oven in order to cause the build material to coalesce upon application of microwave energy.

The method (300) may continue with depositing (310) a coalescing agent onto the layer of build material. As described above, the coalescing agent is placed on portion of the build material where coalescing is to take place according to the three-dimensional model data.

In one example, the control of energy from the coalescing agent to the build material may be accomplished by placing relatively larger or smaller amounts of coalescing agent at any given point on the build material. This can be done in at least three ways.

First, the coalescing agent depositor (115) may have a supply of coalescing agent dispersed in a fluid carrier. A larger quantity or volume of that carrier and coalescing agent is deposited into the build material where a higher degree of coalescence is desired.

Second, the coalescing agent depositor (FIG. 1, 115; FIG. 2, 115) may have a number of different reservoirs or supplies in each of which the coalescing agent is dispersed in a fluid carrier at different dilutions. Thus, where strong coalescing activity is needed, a more concentrated version of the coalescing agent is deposited, in which a relatively large amount of coalescing agent is dispersed in a unit volume of the carrier fluid. Then, where a lesser coalescing activity is wanted, a less concentrated version of the coalescing agent from a different reservoir is used. This less concentrated version of the coalescing agent will have a relatively lesser amount of coalescing agent per unit volume of the fluid carrier. A range of differently diluted coalescing agent may be provided to allow the system greater control over the degree of coalescing activity in different parts of the object being fabricated.

Third, the coalescing agent depositor (FIG. 1, 115; FIG. 2, 115) may deposit a known concentration of coalescing agent on the build material. In this example, the amount of coalescing agent deposited by the coalescing agent depositor (FIG. 1, 115; FIG. 2, 115) may be varied by passing the coalescing agent depositor (FIG. 1, 115; FIG. 2, 115) over any given area a number of times, and depositing the coalescing agent each time.

The method (300) may continue with irradiating (315) the coalescing agent with microwave energy from the radiation source (FIG. 1, 120; FIG. 1, 120) such that the coalescing agent converts the radiation received into heat to coalesce the build material in the portions in which the coalescing agent was deposited. In one example, the irradiation (315) of the coalescing agent may occur for each layer of the three-dimensional object. In this example, the system (FIG. 1, 100; FIG. 2, 200) may deposit (305) a layer of build material, deposit (310) a coalescing agent, and then irradiate (315) the coalescing agent.

In another example, all slices of the three-dimensional object may be built up by depositing (305) layers of build material and depositing (310) a coalescing agent onto each of the layers of build material. After multiple layer or all of the layers have been formed with build material and coalescing agent, the multiple layers may be irradiated (315) together using the radiation source (FIG. 1, 120; FIG. 2, 120). In this example, a powder bed comprising the built up layers and associated with the additive manufacturing device (FIG. 1, 105; FIG. 2, 105) may be delivered into a microwave furnace for application (315) of the radiation.

The radiation source (FIG. 1, 120; FIG. 2, 120) may emit any type of radiation sufficient to cause the build material to coalesce by first heating the coalescing agent thereby causing the heat therefrom to coalesce the build material. The heat produced may be sufficient to heat the build material beyond its melting point or to a temperature suitable to cause softening and bonding of the build material. Heat absorbed during the application of the radiation energy from a portion of build material on which coalescing agent has been delivered or has penetrated may propagate to a previously solidified portion of the build material causing a portion of that portion to heat up above its melting point. This effect may help to generate a portion that has strong interlayer bonding between adjacent layers of solidified build material.

Figure 4:
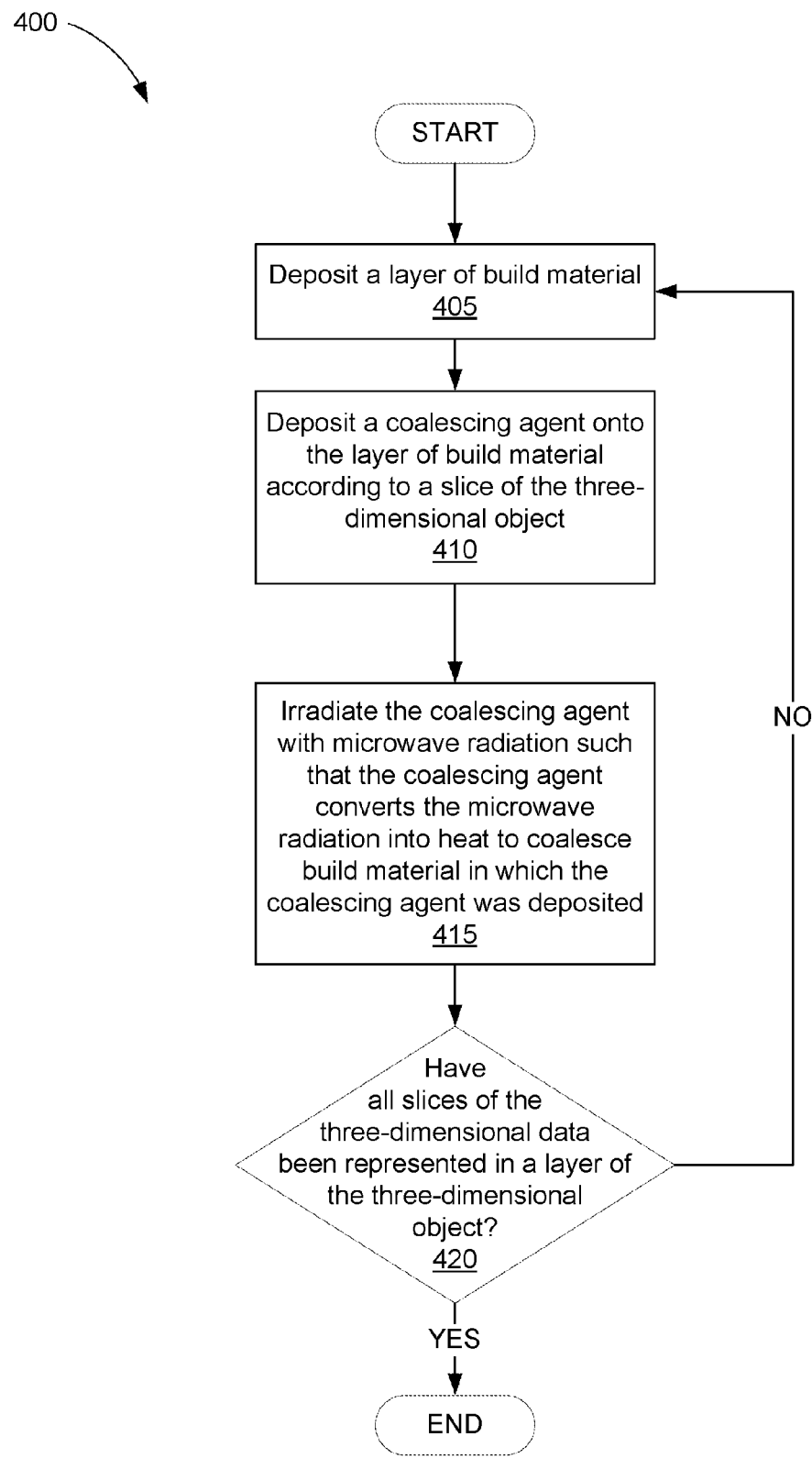
FIG. 4 is a flowchart showing a method of fabricating a three-dimensional object according to another example of the principles described herein.

FIG. 4 is a flowchart showing a method (400) of fabricating a three-dimensional object according to another example of the principles described herein. The method (400) may begin with depositing (405) a layer of build material. The build material may be deposited onto a powder bed as described above using the build material depositor (230). In one example, the powder may be a powder bed comprising an open-topped box structure that exceeds the geometrical dimensions of the three-dimensional object to be printed. The open-topped box may provide, in one example, an enclosure sufficient to hold the build material and coalescing agent during printing.

The method (400) may continue with depositing (410) a coalescing agent onto the layer of build material according to a slice of the three-dimensional object. In one example, a first slice of three-dimensional model data is represented in a first layer of build material and coalescing agent; both being deposited (410) onto the bed. Successive slices of the three-dimensional model data are each represented by a layer of build material and coalescing agent. These layers are individually deposited (410) into the bed.

The method (400) may continue by irradiating (415) the coalescing agent with microwave radiation such that the coalescing agent converts the microwave radiation into heat to coalesce the build material in which the coalescing agent was deposited. In one example, after a first layer of coalescing agent and build material has been irradiated, the three-dimensional model data may comprise further slices or portions of data that are to be represented on the three-dimensional object. Because of this, the method (400) may determine (420) if all slices of the three-dimensional model data has been represented in the three-dimensional object by the deposition of the build material and coalescing agent. Where all portions of the three-dimensional model data have not been represented in the three-dimensional object (Determination 420, NO), the method (400) proceeds by depositing (405) a layer of build material described above using the build material depositor (230), depositing (410) a coalescing agent onto the deposited build material, and irradiating (415) the coalescing agent with a radiation source such that the coalescing agent converts the radiation received into heat to coalesce the build material in, at least, portions of build material in which the coalescing agent was deposited.

This method (400) may continue until all portions of the three-dimensional model data have been represented in the three-dimensional object being generated. In this manner, each slice of three-dimensional model data is represented by a respective layer of build material and coalescing agent.

In one example, the method (400) may be conducted using two levels of radiation energy at two different periods during the generation of the three-dimensional object. In this example, wherever an amount of build material and coalescing agent is deposited (410, 415) a first level of radiation energy is applied to that portion that has been deposited. In this example, some of the build material may be partially coalesced. Subsequent layers of build material and coalescing agent may be added according to the three-dimensional model data and a similar selective and partial coalescing may be done to each layer applied. In this way, a relatively mechanically stable structure may be placed in a radiation furnace where a second higher level of radiation energy is applied to fully coalesce the three-dimensional object. This example method provides for relatively more stability in the three-dimensional object as the object is moved from the additive manufacturing device to, for example, a furnace.

As mentioned above, the method (400) may include layering all layers of the three-dimensional object before application of the radiation, applying the radiation to individual slices as they are layered, applying the radiation to individual portions of the three-dimensional object as those portions are generated, applying a relatively low intensity of radiation to the coalescing agent during the generation of the three-dimensional object and not fully completing the coalescing of the build material, and applying a relatively higher intensity (higher than the low intensity) radiation after all layers have been deposited. Any permutation of these processes in any combination may be employed to achieve specific properties or characteristics of the three-dimensional object being generated.

Figure 5:
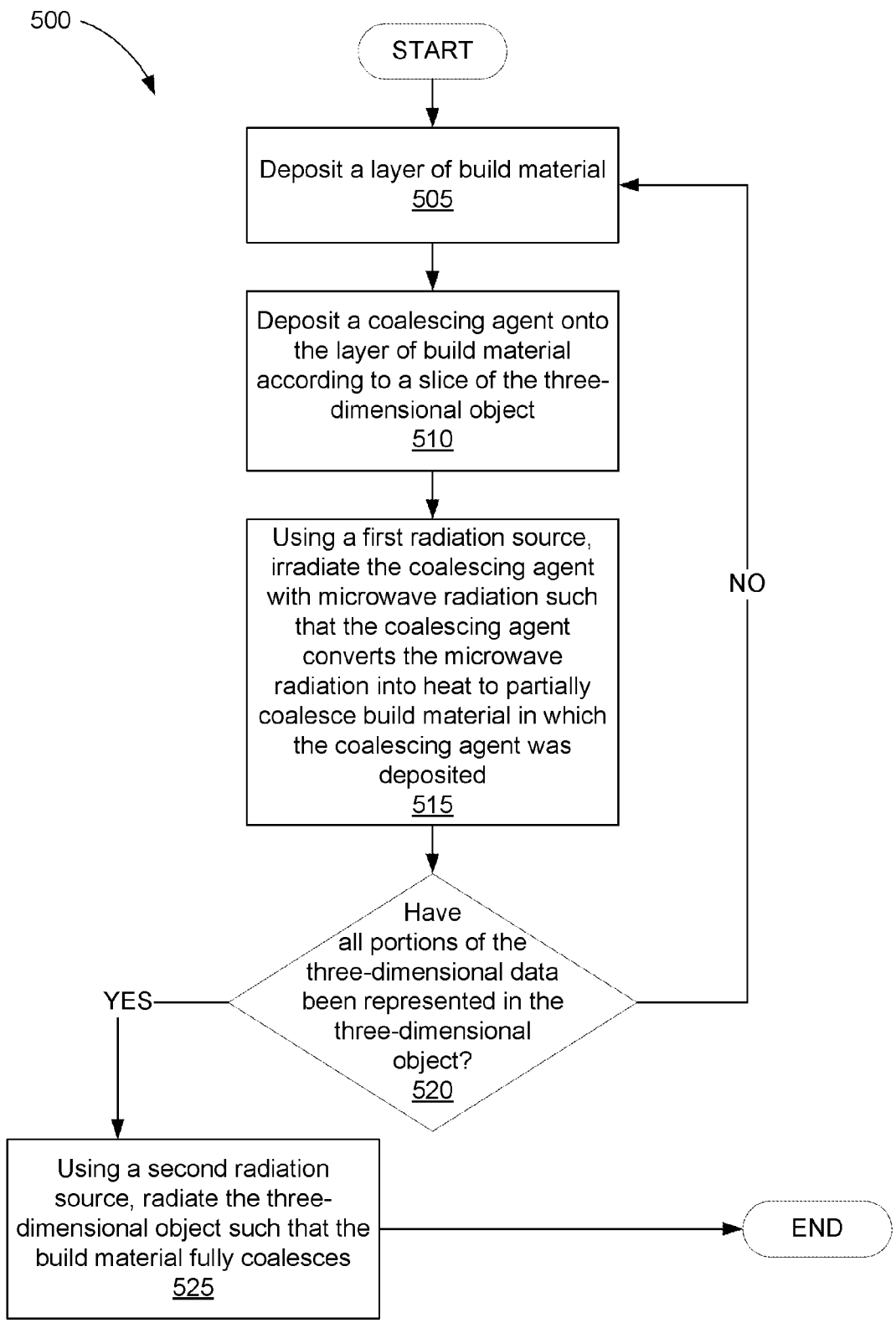
FIG. 5 is a flowchart showing a method (400) of fabricating a three-dimensional object according to another example of the principles described herein.

FIG. 5 is a flowchart showing a method (500) of fabricating a three-dimensional object according to another example of the principles described herein. The method (500) may begin with depositing (505) a layer of build material on a substrate as described above using the build material depositor (230). Again, as described above this layer of build material represents a physical space where a slice of the three-dimensional model data for the three-dimensional object is to be generated. A coalescing agent may then be deposited (510) onto the layer of build material for a number of portions of a three-dimensional object. Here, the deposition (510) of the coalescing agent is defined by at least a portion or slice the three-dimensional model data. Wherever the coalescing agent is deposited, a portion of the three-dimensional object may be formed upon application of the radiation from the radiation source (FIG. 1, 120; FIG. 2, 120).

The method (500) may then proceed with irradiating (515) the coalescing agent such that the coalescing agent converts the radiation received into heat to coalesce the build material in the portions in which the coalescing agent was deposited. In this example, the source of the radiation is a first microwave radiation source that provides relatively lower intensity radiation to the coalescing agent such that the build material is not fully coalesced after the application. This lower intensity may be accomplished by either adjusting the power of the radiation source or adjusting the time the coalescing agent is subjected to the radiation.

The method (500) may then determine (520) if all portions of the three-dimensional model data has been represented in the three-dimensional object by the deposition of the build material and coalescing agent. Where all portions of the three-dimensional model data have not been represented in the three-dimensional object (Determination 520, NO), the method (500) proceeds by depositing (505) a layer of build material described above using the build material depositor (230), depositing (510) a coalescing agent onto the deposited build material according to a slice of the three-dimensional object, and irradiating (515) the coalescing agent with the first radiation source as described above. Where all portions of the three-dimensional model has been represented in the three-dimensional object (Determination 520, YES), the process then continues by irradiating (525) the three-dimensional object such that the build material fully coalesces. This process may be done using a second radiation source that subjects the three-dimensional object to relatively higher radiation energy. This fully coalesces the three-dimensional object. In one example, the second radiation source may be embodied in the same device as the first radiation source with the device providing two separate intensities of radiation energy. In another example, the first radiation source may be located on an additive manufacturing device (FIG. 1, 105; FIG. 2, 105) while the second radiation source is a separate furnace type radiation source where the partially coalesced three-dimensional object is transported from the additive manufacturing device (FIG. 1, 105; FIG. 2, 105) to the furnace. In one example, the transportation of the three-dimensional object from the additive manufacturing device (FIG. 1, 105; FIG. 2, 105) to the furnace is done by removing the build material bed from the additive manufacturing device (FIG. 1, 105; FIG. 2, 105) and placing it into the radiation furnace.

Aspects of the present system (100, 200) and method (300) are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general purpose computer, special purpose computer, or other programmable data processing apparatus to produce a machine, such that the computer usable program code, when executed via, for example, the processor (FIG. 1, 110; FIG. 2, 110) of the additive manufacturing device (FIG. 1, 105; FIG. 2, 105) or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

Specifically, the computer usable code may comprise computer usable code to, when executed by a processor, direct a build material depositor to deposit a layer of build material on a substrate, direct a coalescing agent depositor to deposit a coalescing agent onto the layer of build material for a number of slices of a three-dimensional object, and direct a radiation source to irradiate the coalescing agent such that the coalescing agent converts the radiation received into heat and coalesces the build material in the portions in which the coalescing agent was deposited.

The specification and figures describe fabricating a three-dimensional object. A method of fabricating a three-dimensional object comprises depositing a layer of build material onto a surface, depositing a coalescing agent onto the material and irradiating the coalescing agent sufficient to cause the build material to coalesce. This generation of a three-dimensional object may have a number of advantages, including forgoing the application of a binding agent to the build material or material. In this case, excess build material need not be removed before the non-coalesced three-dimensional object is subjected to a radiation source such as a microwave oven. Additionally, leaving the structure in the build material bed during the coalescing process may provide additional support for the object being generated. Additionally, the use of microwave radiation to heat the coalescing agent uses less than $\frac{1}{3}^{rd}$ of the energy used with other additive manufacturing processes. Still further, the present method produces relatively greater quality three-dimensional objects in approximately $\frac{1}{10}^{th}$ the time of additive manufacturing processes. As an additional benefit, the build material used may further act as an insulating material where no coalescing agent has been applied.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method of fabricating a three-dimensional object, comprising:
depositing a layer of build material;
depositing a coalescing agent onto the layer of build material according to a slice of three-dimensional model data; and
irradiating the coalescing agent with microwave radiation such that the coalescing agent converts the microwave radiation into heat to coalesce the build material in which the coalescing agent was deposited;
wherein irradiating the coalescing agent comprises irradiating the coalescing agent with a first microwave radiation to partially coalesce the build material prior to irradiating the coalescing agent with a second relatively more intense microwave radiation to fully coalesce the build material.

2. The method of claim 1, wherein the build material is substantially transparent to the radiation.

3. The method of claim 1, wherein the coalescing agent in each individual layer of build material is irradiated with the first microwave radiation and the coalescing agent in all of the layers of build material is irradiated together with the second microwave radiation.

4. The method of claim 1, wherein the coalescing agent in each layer of build material is irradiated before a successive layer of build material and coalescing agent is deposited.

5. The method of claim 1, wherein the coalescing agent in each layer of build material is deposited for the entire three-dimensional object before the layers are irradiated.

6. The method of claim 1, wherein the build material comprises any of a ceramic, glass and metal oxide.

7. The method of claim 1, wherein the coalescing agent comprises any of carbon black, graphite and metallic nanoparticles.

8. The method of claim 1, further comprising using a data storage device and an apparatus to generate a three-dimensional object, comprising:
a coalescing agent depositor;
a build material layer depositor;
a processor; and
the data storage device communicatively coupled to the processor;
the method comprising, with the processor, executing computer code to control the coalescing agent depositor to deposit an amount of coalescing agent onto a layer of build material according to a three-dimensional model data stored in the data storage device, the build material being transparent to microwave radiation; and
the processor to execute computer code to control the coalescing agent depositor and build material layer depositor so that each layer of coalescing agent and build material is deposited for the entire three-dimensional object before the layers are irradiated with microwave radiation.

9. The method of claim 8, wherein the build material is ceramic.

10. The method of claim 8, wherein the coalescing agent comprises any of carbon black, graphite and metallic nanoparticles.

11. The method of claim 8, further comprising moving the layers of build material and coalescing agent representing the entire three-dimensional object into a microwave furnace for irradiation.

12. The method of claim 1, further comprising depositing a range of differently diluted coalescing agent with more-concentrated coalescing agent being applied at locations of the build material where a higher degree of coalescence is desired.

13. The method of claim 1, further comprising depositing a relatively greater quantity of coalescing agent to the build material at locations where a higher degree of coalescence is desired.

14. The method of claim 1, further comprising heating the coalescing agent prior to the coalescing agent being deposited to the build material.

15. The method of claim 1, wherein the coalescing agent comprises any of: nanoglass, nano-oxides and iron ferrite.

* * * * *